United States Patent [19]
Kang et al.

[11] Patent Number: 6,038,220
[45] Date of Patent: Mar. 14, 2000

[54] METHOD AND APPARATUS OF FORWARD TRAFFIC CHANNEL POWER CONTROL FOR CDMA WIRELESS LOCAL LOOP SYSTEM

[75] Inventors: Chang Soon Kang; Hun Lee; Cheol Hoi Cho; Ki Seok Kim, all of Daejeon, Rep. of Korea

[73] Assignees: Electronics and Telecommunications Research Institute, Daejeon; Korea Telecom; DACOM Corporation, both of Seoul, all of Rep. of Korea

[21] Appl. No.: 08/961,326

[22] Filed: Oct. 30, 1997

[30] Foreign Application Priority Data

Jul. 10, 1997 [KR] Rep. of Korea ............... 97-31977

[51] Int. Cl.⁷ .................. H04J 1/16; H04B 1/00; H04B 7/00
[52] U.S. Cl. ................ 370/252; 370/335; 455/69; 455/522
[58] Field of Search ................ 370/301–311, 252, 370/335, 342; 455/67.1, 69, 522, 517, 38.3

[56] References Cited

U.S. PATENT DOCUMENTS

| | | |
|---|---|---|
| 5,093,840 | 3/1992 | Schilling . |
| 5,465,269 | 11/1995 | Schaffner et al. ............ 375/200 |
| 5,771,461 | 6/1998 | Love et al. ............ 455/522 |
| 5,799,010 | 8/1998 | Lomp et al. ............ 370/335 |
| 5,838,733 | 11/1998 | Bruckert ............ 375/297 |
| 5,842,114 | 11/1998 | Ozluturk ............ 455/69 |
| 5,881,094 | 3/1999 | Schilling ............ 375/202 |
| 5,884,187 | 3/1999 | Ziv et al. ............ 455/522 |
| 5,887,262 | 3/1999 | Willhof ............ 455/452 |
| 5,893,035 | 4/1999 | Chen ............ 455/522 |
| 5,912,884 | 6/1999 | Park et al. ............ 370/331 |

Primary Examiner—Douglas W. Olms
Assistant Examiner—David R Vincent
Attorney, Agent, or Firm—Cohen, Pontani, Lieberman & Pavane

[57] ABSTRACT

The present invention relates to a method and apparatus of a forward traffic channel power control for a code division multiple access (CDMA) wireless local loop system not having a hand-off function. The present invention distinguishes between a normal mode and a threshold mode in a CDMA wireless local loop. Here, the total power is lower than a predetermined power threshold value in the normal mode, and the total power arrives at the predetermined power threshold value in the threshold mode. In addition, the present invention varies method of increasing/reducing the forward traffic channel power according to the determined mode. As a result, method and apparatus according to the present invention effectively reduces the forward link interference signal at nearby cells, and provides a proper traffic quality.

6 Claims, 4 Drawing Sheets

METHOD AND APPARATUS OF FORWARD TRAFFIC CHANNEL POWER CONTROL FOR CDMA WIRELESS LOCAL LOOP SYSTEM

BACKGROUND OF THE INVENTION

1. Field of the Invention

The present invention generally relates to a method and apparatus of a forward traffic channel power control for a code division multiple access (hereinafter referred to as a CDMA) wireless local loop system. More particularly, it relates to a method and apparatus of a forward link power control in a CDMA wireless local loop system.

2. Description of the Conventional Art

Generally, a forward link (i.e., a wireless link from a base station to a mobile station) power control in a mobile communication system using CDMA is performed at every traffic channel which transmits traffic information to each mobile station.

FIG. 4 is a conceptual diagram illustrating a general CDMA wireless local loop system.

As shown in FIG. 4, a mobile station 411 includes at least one terminal (e.g., a telephone set and/or a terminal for data service) in a cell 410, and has all functions which are needed to achieve communication between a base station 412 and the mobile station 411.

The base station 412 receives all kinds of control information necessary for the mobile station 411's communication, and traffic information after setting a call. In addition, the base station 412 transmits various information to the mobile station 411.

Likewise, a base station 422 and a mobile station 421 perform the same function as the above stations 412 and 411, respectively.

To compensate a propagation environment and a path loss caused by a distance from the mobile station to the base station, the base stations 412 and 422 control a forward link (i.e., link from the base station to the mobile station) traffic channel power when operating in a cellular communication.

In order to maintain a communication quality of the mobile stations being used in the base stations 412 and 422, the base stations 412 and 422 respectively control a transmission power of the forward traffic channel in consideration of the propagation environment and the path loss. Accordingly, a large quantity of signal power are transmitted to the mobile stations 411 and 421 respectively located in the vicinity of the edges of the cells 410 and 420.

However, if the traffic loads increase in the cell 420 served by the base station 422, the mobile station 411 being communicated with the base station 412 becomes receive more strong interference signal from the base station 422, thereby degrading the communication quality.

When the mobile station 411 being communicated with the home base station 412 receives more strong signal from the adjacent cell 420, the mobile station 411 performs a hand-off function toward the adjacent cell 420, thereby continuously preserving the cellular communication. As a result, it can reduce the influence of interference signal applied from the adjacent cell in a boundary portion between the cells.

However, the wireless local loop system not having the hand-off function can not switch its communication channel to the adjacent cell, in case the interference is increased in the forward link, thereby exacerbating the communication quality.

Accordingly, if the traffic loads (i.e., the number of busy mobile stations) of the adjacent cell 420 increase, the interference power of the forward link of the mobile station 411 being busy in the predetermined cell 410 becomes increased. As a result, the communication quality of the mobile station 411 positioned in the vicinity of the edge of the adjacent cell 420 becomes lowered, thereby causing a drop of the call.

In particular, the interference signal's variation in a wireless local loop system providing data traffic as well as voice traffic simultaneously is larger than that in a single traffic environment (i.e., wireless network which provides only voice traffic or data traffic), thus the aforementioned problem becomes more serious.

A conventional power control method about the forward traffic channel controls the transmission power of the forward traffic channel, not in view of the interference quality which comes to the adjacent cell, but in view of the traffic quality of the mobile station which is busy in the home cell.

The reason why the conventional power control method controls the transmission power is that the interference influence varied in response to the traffic variation can be compensated by the hand-off function if a proper communication quality is ensured.

That is, in order to enhance the communication quality of the mobile station being busy at the edge of the home cell in the digital mobile communication system, the base station should transmit more power toward the forward traffic channel. In this case, a corresponding mobile station maintains a proper traffic quality, and causes more strong interference signal on the forward link.

However, if there is a cell having a small quantity of traffics in the adjacent cells, a channel propagation environment toward the adjacent cell is better than a channel propagation environment of the home cell, so that the mobile station can perform the hand-off function.

When the interference signal level becomes higher due to the increased traffics within the cell, the conventional digital mobile communication system lowers a power control threshold value, or uniformly reduces the traffic channel transmission power of all mobile stations being busy in the home cell as much as a predetermined value, thereby lowering a call drop rate. However, this method has a disadvantage which lowers the communication quality of the mobile station.

SUMMARY OF THE INVENTION

Accordingly, the present invention is directed to a method and apparatus of a forward traffic channel power control for a CDMA wireless local loop system that substantially obviate one or more of the problems due to limitations and disadvantages of the conventional art.

It is an objective of the present invention to provide a method and apparatus of a forward traffic channel power control for a CDMA wireless local loop system, which effectively control a transmission power of the forward traffic channels, thereby provide mobile stations with a proper traffic(i.e., a cellular communication) quality, simultaneously with reducing the forward link interference signal power caused by the increased traffic in CDMA wireless local loop system.

To achieve the above object, in a forward link power control method of CDMA wireless local loop system which lowers the forward link interference signal caused by the adjacent cells and thus provides a good communication quality, a method of controlling a forward traffic channel power for a CDMA wireless local loop system according to the present invention, includes:

first step of receiving a ratio of bit-energy to noise (hereinafter referred to as a bit-energy/noise ratio) of forward traffic channels, the bit-energy/noise ratio which is measured and reported by mobile stations;

second step of determining whether a total power allocated in the forward channels managed by a base station is a normal mode at which the total power is lower than a predetermined power threshold value, or is a threshold mode at which the total power arrives at the predetermined power threshold value;

third step in which, if the normal mode is determined in the second step, the bit-energy/noise ratio in the first step is compared with the target bit-energy/noise ratio, and a forward traffic channel transmission power is adjusted in response to a difference between the bit-energy/noise ratio and the traget bit-energy/noise ratio; and fourth step in which, if the threshold mode is determined in the second step, the bit-energy/noise ratio in the first step is compared with the target bit-energy/noise ratio, and the forward traffic channel transmission power is adjusted in response to a difference between the bit-energy/noise ratio and the target bit-energy/noise ratio.

The third step, if the bit-energy/noise ratio is lower than the target bit-energy/noise ratio, increases the forward traffic channel's transmission power as much as the power corresponding to a difference between the bit-energy/noise ratio and the target bit-energy/noise ratio. On the contrary, if the bit-energy/noise ratio is higher than the target bit-energy/noise ratio, the third step reduces the forward traffic channel's transmission power as much as power corresponding to a difference between the bit-energy/noise ratio and the target bit-energy/noise ratio.

The fourth step, if the bit-energy/noise ratio is higher than the target bit-energy/noise ratio, reduces the forward traffic channel's transmission power as much as the power corresponding to a difference between the bit-energy/noise ratio and the targer bit-energy/noise ratio. On the contrary, if the bit-energy/noise ratio is lower than the targer bit-energy/noise ratio, the fourth step increases the power of the forward traffic channel as much as a predetermined minimum transmission power.

An apparatus for controlling a forward traffic channel power of CDMA wireless local loop system according to the present invention, includes:

a mobile station receiver for receiving a traffic information signal transmitted from a base station via a traffic channel;

a mobile station traffic channel demodulator which performs an inverse spread spectrum process so as to obtain information transmitted from the received signal via the traffic channel, and demodulates the received traffic information data;

a measuring portion of a ratio of a receiving bit-energy to noise (hereinafter referred to as a receiving bit-energy/noise ratio) of forward traffic channel at a mobile station, which measures the receiving bit-energy/noise ratio of the traffic channel from the demodulated receiving data;

a mobile station modulator for performing a digital modulation about the receiving bit-energy/noise ratio of the traffic channels;

a mobile station transmitter for transmitting a modulated signal to the base station;

a base station receiver for receiving a transmission data of the mobile station;

a base station digital demodulator for performing a base band digital signal received from a mobile station;

a base station decoder for determining whether there is an error in the demodulated bit-energy/noise ratio information measured and reported by the mobile station;

means for determining and controlling a base station transmission power which receives the information after an error check, compares the bit-energy/noise ratio with a target bit-energy/noise ratio, and determines whether a power about the forward traffic channel is increased or reduced;

a base station traffic channel modulator which modulates a traffic information signal with a traffic channel modulation gain corresponding to a power determined at the means for determining and controlling the base station transmission power; and a base station transmitter which transmits the modulated traffic information signal to the mobile station through the traffic channel.

The method and apparatus for controlling the forward traffic channel transmission power in accordance with the present invention reduce the forward link's interference signal power caused by the increased traffics of adjacent cell, and provide the mobile station with a good traffic(i.e., a cellular communication) quality.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The preferred embodiment of the present invention will become apparent from a study of the following detailed description, when viewed in light of the accompanying drawings.

Figure 1:
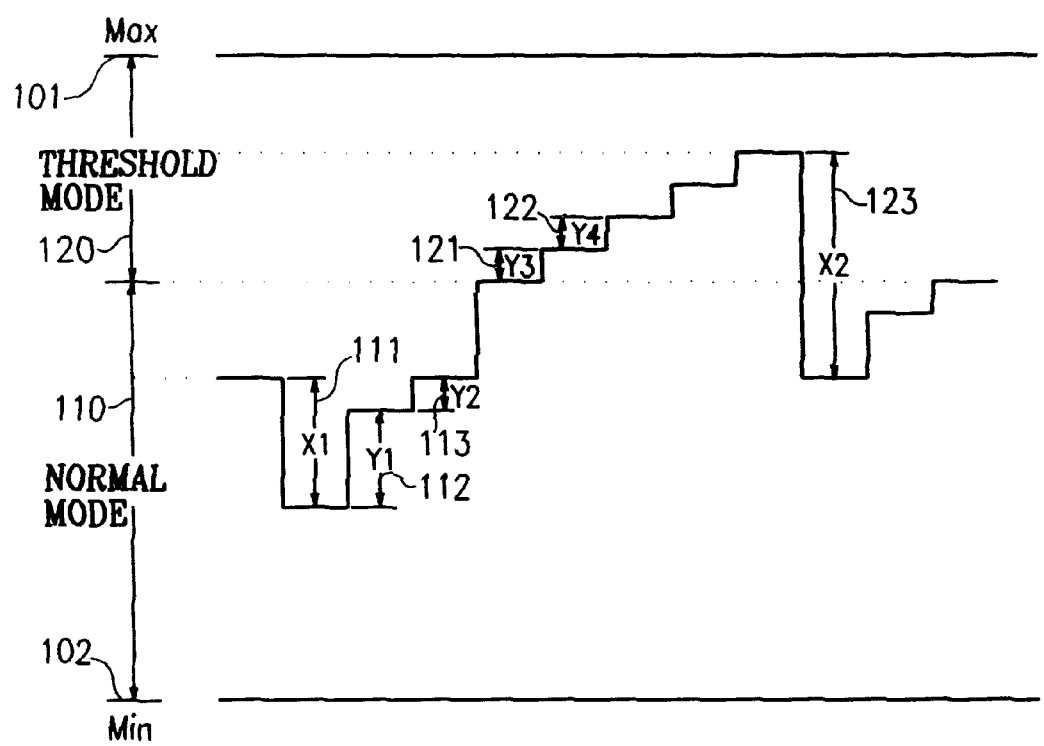
FIG. 1 show a forward traffic channel power control method for a CDMA wireless local loop system in accordance with a preferred embodiment of the present invention.

FIG. 1 show a forward traffic channel power control method for a CDMA wireless local loop system in accordance with the present invention.

The method of controlling a power about the forward traffic channels will now be described in the following.

First, a first step in which the base station receives the receiving bit-energy/noise ratio of the forward traffic channels, which the ratio is measured by the mobile stations, is performed.

After that, a second step determines whether a total power allocated in the forward channels managed by a base station is a normal mode at which the total power is lower than a predetermined power threshold value, or is a threshold mode at which the total power arrives at the predetermined power threshold value.

As shown in FIG. 1, a maximum transmission power Max 101 means a transmission power (or a channel gain) which is capable of being maximally allocated in one forward traffic channel.

A transmission power Min 102 means a minimum transmission power (or a channel gain) which is capable of being allocated in one forward traffic channel.

Figure 3:
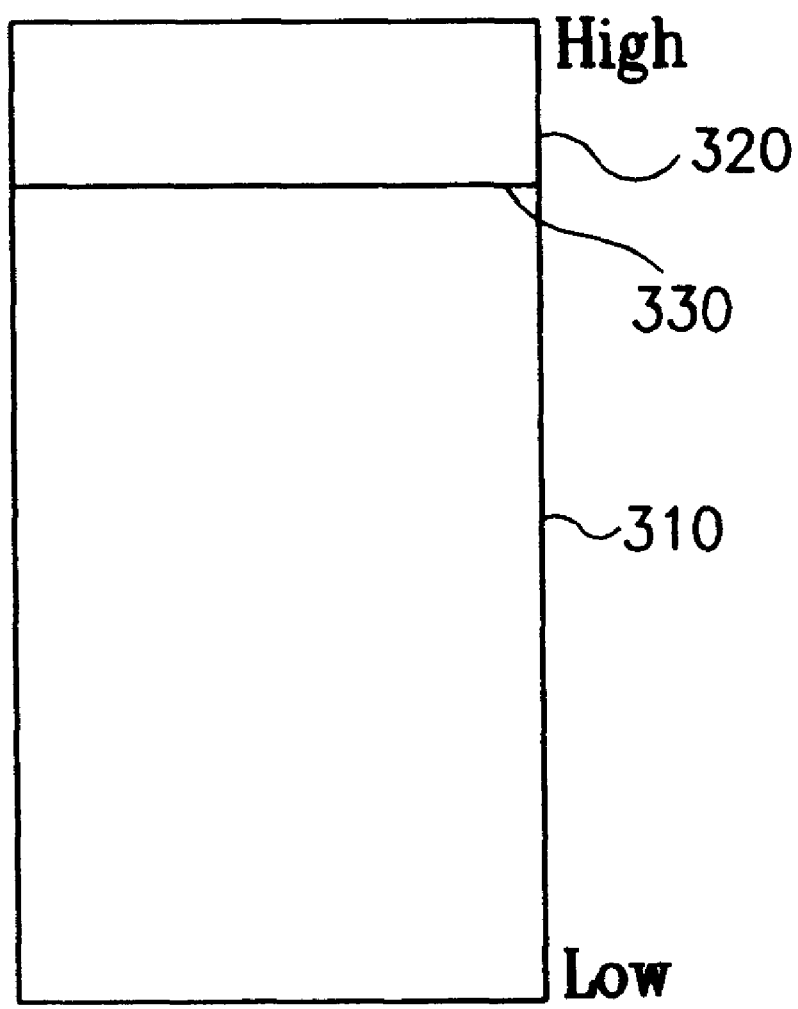
FIG. 3 is a state of total power allocated into a forward channel by a base station in accordance with a preferred embodiment of the present invention.
Figure 4:
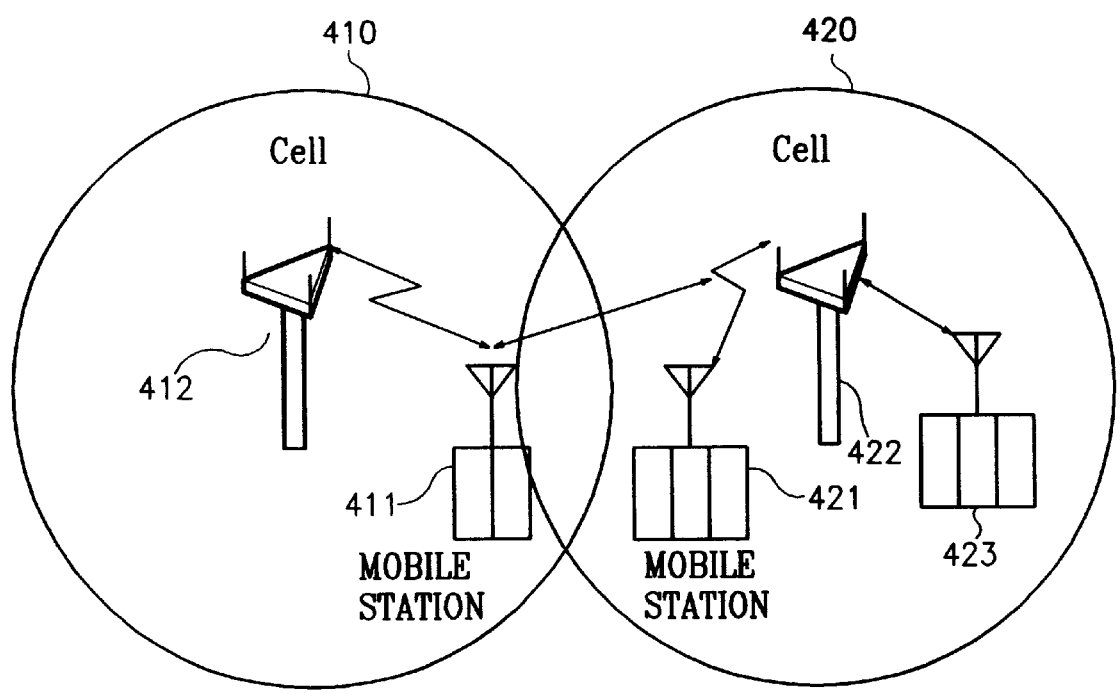
FIG. 4 is a conceptual diagram illustrating a general CDMA wireless local loop system.

The normal mode 110 means that the total power previously allocated into all forward channels by the base station is not reached to a predetermined power threshold value 303 in FIG. 3.

The threshold mode 120 means that the total power previously allocated into all forward channels by the base station arrives at the predetermined power threshold value 303.

Then, a third step is performed. In the third step, if the second step determines the normal mode, the bit-energy/noise ratio of the first step is compared with a target bit-energy/noise ratio, and the forward traffic channel transmission power is adjusted in response to a difference between the bit-energy/noise ratio and the target bit-energy/noise ratio.

That is, the third step, if the bit-energy/noise ratio which is measured and reported by the mobile stations is lower than the target bit-energy/noise ratio, increases the forward traffic channel's transmission power as much as the power corresponding to a difference between the bit-energy/noise ratio and the target bit-energy/noise ratio. On the contrary, if the bit-energy/noise ratio which is measured and reported by the mobile stations is higher than the target bit-energy/noise ratio, the third step reduces the forward traffic channel's transmission power as much as power corresponding to a difference between the bit-energy/noise ratio and the target bit-energy/noise ratio.

If the third step reduces the power, the power is reduced by X1(111), and if the third step increases the power, the power increases by Y1(112) or Y2(113). Herein, a power corresponding to a difference between the target bit-energy/noise ratio and a forward traffic channel's receiving bit-energy/noise ratio measured and reported by the mobile station, is increased or reduced.

A fourth step is then performed. In the fourth step, if the threshold mode is determined in the second step, the bit-energy/noise ratio of the first step is compared with the target bit-energy/noise ratio, and the forward traffic channel transmission power is adjusted in response to a difference between the bit-energy/noise ratio and the target bit-energy/noise ratio.

That is, the fourth step, if the bit-energy/noise ratio measured and reported by the mobile stations is higher than the target bit-energy/noise ratio, reduces the forward traffic channel's transmission power as much as the power corresponding to a difference between the bit-energy/noise ratio and the target bit-energy/noise ratio. On the contrary, if the bit-energy/noise ratio measured and reported by the mobile stations is lower than the power control threshold value, the fourth step increases the power of the forward traffic channel as much as a predetermined minimum transmission power.

A procedure of the threshold mode 120 is slightly different from that of the normal mode 110.

That is, in case the power is reduced, the threshold mode 120 and the normal mode 110 reduce the power as much as a power corresponding to a difference between the forward receiving bit-energy/noise ratio and the target bit-energy/noise ratio.

However, in case the power increases by X2(123) shown in FIG. 1, that is, if the receiving bit-energy/noise ratio of the forward traffic channel is lower than the target bit-energy/noise ratio, under the normal mode 110, the receiving bit-energy/noise ratio increases by the difference between the bit-energy/noise ratio and the target bit-energy/noise ratio. But, under the threshold mode 120, the receiving bit-energy/noise ratio increases by a predetermined minimum value Y3(121) or Y4(122), (where, Y3=Y4).

In the meantime, when the target bit-energy/noise ratio is applied to the hybrid system using both an audio signal and data signal, the target bit-energy/noise ratio is differently determined in regard to each of the voice traffic and the data traffic. In this manner, the forward traffic channel power control may be controlled in the hybrid system using both the voice signal and the data signal. That is, when the receiving bit-energy/noise ratio is compared with the target bit-energy/noise ratio, a target bit-energy/noise ratio regarding the voice traffic may be set to be lower than that regarding the data traffic. Accordingly, in case of a power control regarding the voice traffic channel, the receiving bit-energy/noise ratio is compared with a target bit-energy/noise ratio of the voice traffic, and a transmission power can be increased or reduced as much as the difference between them. In case of a power control regarding the data traffic channel, the receiving bit-energy/noise ratio is compared with a target bit-energy/noise ratio of the data traffic, and a transmission power can be increased or reduced as much as the difference between them.

In this manner, the power which can be allocated into one forward traffic channel in the normal mode and the threshold mode is adjusted between a maximum transmission power 101 and a minimum transmission power 102, so that the forward link interference signal caused by the adjacent cells can be reduced, thereby providing a good communication quality.

FIG. 3 is a state of total power allocated into all forward channels (i.e., a pilot channel, a synchronizing channel, a paging channel, a signal channel, and a traffic channel) by a base station. In this state, the power control method is operated as a normal mode 110.

A power 320 means a quantity of the power which is not allocated into the channels.

The threshold value 330 of power is a power quantity allocated in the forward channels from the base station. If the power quantity is reached to a predetermined threshold value, it means that traffic quantity is increased in home cell or in adjacent cells. The base station controls a transmission power of the forward traffic channel by using a power control method at the threshold mode 120.

Figure 2:
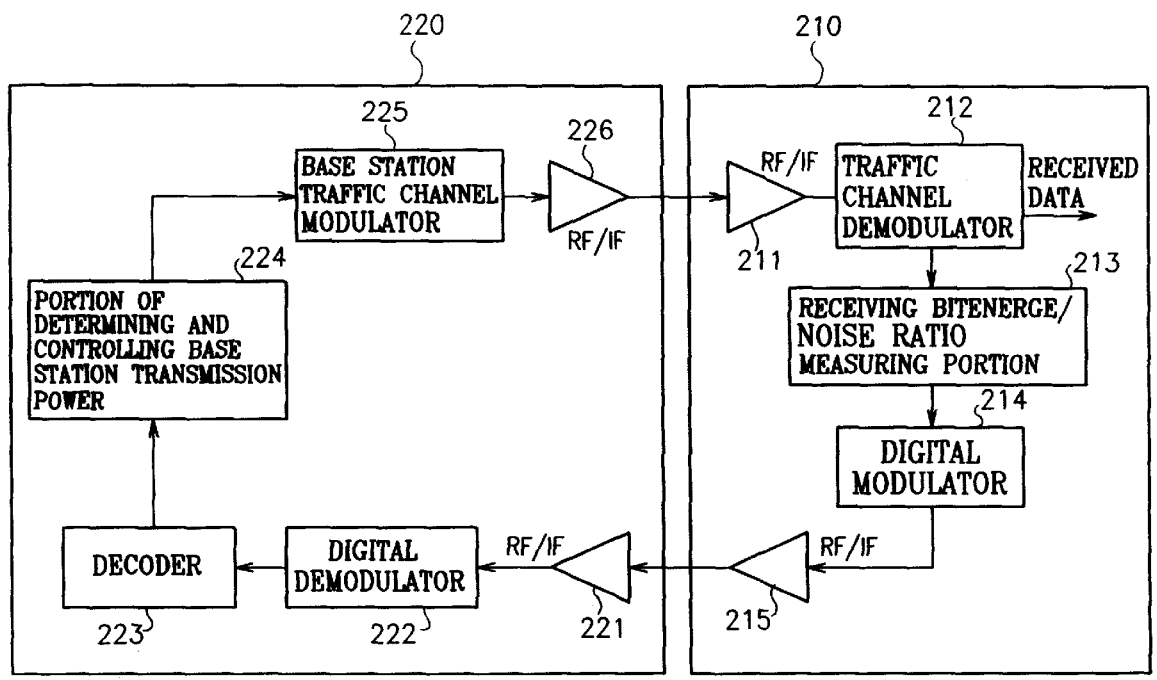
FIG. 2 is a block diagram illustrating a power control apparatus of a forward traffic channel in accordance with a preferred embodiment of the present invention.

FIG. 2 is a block diagram illustrating an apparatus for controlling a power control of a forward traffic channel in accordance with the present invention.

The apparatus for controlling a forward traffic channel power of CDMA wireless local loop system, includes:

a mobile station receiver 211 for receiving a traffic information signal transmitted from a base station via a traffic channel;

a mobile station traffic channel demodulator 212 which demodulates a receiving data by performing an inverse spread process, and obtains information transmitted from a received signal via the traffic channel;

a receiving bit-energy/noise ratio measuring portion 213 of a mobile station forward traffic channel, which measures the receiving bit-energy/noise ratio of the traffic channel from the demodulated receiving data;

a mobile station modulator 214 for performing a digital modulation about the receiving bit-energy/noise ratio of the traffic channel;

a mobile station transmitter 215 for transmitting a modulated signal to the base station;

a base station receiver 221 for receiving a transmission data of the mobile station;

a base station digital demodulator 222 for performing a base band digital modulation about the data transmitted data from the base station receiver; a base station decoder 223 for determining whether there is an error in the demodulated bit-energy/noise ratio information measured by the mobile station;

means 224 for determining and controlling a base station transmission power which receives the information via an error check, compares the bit-energy/noise ratio measured by the mobile station with a threshold value of the forward traffic channel power control (target bit-energy/noise ratio), and determines whether a power about the forward traffic channel is increased or reduced;

a base station traffic channel modulator 225 which modulates a traffic information signal with a traffic channel modulation gain corresponding to a power determined at the means for determining and controlling the base station transmission power; and a base station transmitter 226 which transmits the modulated traffic information signal to the mobile station through the traffic channel.

A mobile station apparatus 210 shown in FIG. 2 has audio and data service functions. The base station apparatus 220 performs a CDMA signal processing in regard to the audio traffic and data traffic information which are transmitted from the mobile station 210, and then performs a transmitting/receiving function.

Also, the mobile station 210 may be comprised of the plurality of mobile stations.

The forward traffic transmission power control is operated as follows.

If the signal information is received from the home base station 220 via a mobile station antenna and a high-frequency/intermediate frequency receiver 211, the signal information is transmitted to the mobile station traffic channel demodulator 212.

The traffic channel demodulator 212 demodulates the receiving data from base station traffic channel by despreding process.

The receiving bit-energy/noise ratio measuring portion 213 of a mobile station forward traffic channel measures the receiving bit-energy/noise ratio of the traffic channel from the demodulated receiving data.

The digital modulator 213 performs a digital modulation about the measured receiving bit-energy/noise ratio of the traffic channel, the mobile station changes the digital modulated signal to the intermediate frequency signal and the high frequency signal, these frequency signals are transmitted to the base station 220.

At this time, the mobile station may transmit the receiving bit-energy/noise ratio to the base station 220 through an additional channel.

The data transmitted from the mobile station is input to the base station receiver 221 of the base station 220.

The base station digital demodulator 222 performs a base band digital demodulation about the receiving bit-energy/noise ratio of the mobile station.

The base station decoder 223 determines whether there is an error in the demodulated receiving bit-energy/noise ratio.

After finishing an error check, the means 224 for determining and controlling the base station transmission power compares the receiving bit-energy/noise ratio with the threshold value of the forward traffic channel power control (targer bit-energy/noise ratio), and determines whether a power about the forward traffic channel is increased or reduced. According to this determination, the transmission power of the traffic channel is adjusted.

The traffic channel modulator 225 modulates a traffic information signal with a traffic channel modulation gain corresponding to the power determined at the means 224 for determining and controlling the base station transmission power. By the base station transmitter 226, the modulated traffic information signal with the determined transmission power is transmitted to the mobile station 210 through the traffic channels.

As described above, the method and apparatus for controlling the forward traffic channel power in accordance with the present invention lower the forward link interference signal caused by the traffic increase of the adjacent cells, and thus provides a good communication quality to the mobile stations.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method of controlling a forward traffic channel transmission power for lowering a forward link interference signal caused by adjacent cells and providing a good communication quality in a code division multiple access (CDMA) wireless local loop system, comprising the steps of:

a. receiving a bit-energy/noise ratio of forward traffic channels, the bit-energy/noise ratio being measured and reported by mobile stations;

b. determining whether a total power allocated in all forward channels managed by a base station is in a normal mode, at which the total power is lower than a predetermined power threshold value, or in a threshold mode, at which the total power is at the predetermined power threshold value;

c. comparing the bit-energy/noise ratio of step a with a target bit-energy/noise ratio for determining a difference between the the bit-energy/noise ratio and the target bit-energy/noise ratio and adjusting the forward traffic channel transmission power in response to the difference if the normal mode is determined in step b; and d. comparing the bit-energy/noise ratio of step a with a target bit-energy/noise ratio for determining a difference between the the bit-energy/noise ratio and the target bit-energy/noise ratio and adjusting the forward traffic channel transmission power using predetermined values in response to the difference if the threshold mode is determined in step b.

2. The method of claim 1, wherein step c comprises the step of increasing the forward traffic channel transmission power by an amount of power corresponding to the difference between the bit-energy/noise ratio and the target bit-energy/noise ratio when the bit-energy/noise ratio in step a is lower than the target bit-energy/noise ratio, and reducing the forward traffic channel transmission power by an amount of power corresponding to a difference between the bit-energy/noise ratio and the target bit-energy/noise ratio when the bit-energy/noise ratio of step a is higher than the target bit-energy/noise ratio.

3. The method of claim 1, wherein step d comprises the step of reducing the forward traffic channel transmission power by an amount of power corresponding to the difference between the bit-energy/noise ratio and the target bit-energy/noise ratio when the bit-energy/noise ratio of step a is higher than the target bit-energy/noise ratio, and increasing the power of the forward traffic channel by an amount of power corresponding to a predetermined minimum transmission power when the bit-energy/noise ratio in step a is lower than the target bit-energy/noise ratio.

4. The method of claim 1, further comprising the step of setting a plurality of target bit-energy/noise ratios in response to a type of traffic.

5. The method of claim 4, wherein the step of setting a plurality of target bit-energy/noise ratios includes setting a first target bit-energy/noise ratio for a voice type traffic and a second target bit-energy/noise ratio for a data type traffic, and wherein a first power control threshold value of the voice traffic being lower than a second power control threshold value of the data traffic.

6. An apparatus for controlling a forward traffic channel transmission power of a code division multiple access (CDMA) wireless local loop system, comprising:

a mobile station receiver for receiving a traffic information signal containing traffic information data transmitted from a base station via a traffic channel;

a mobile station traffic channel demodulator for demodulating the received traffic information data by performing an inverse spread spectrum process, thereby obtaining the received traffic information data from the traffic channel;

a receiving bit-energy/noise ratio measuring portion of a mobile station forward traffic channel for measuring a bit-energy/noise ratio of the traffic channel from the demodulated received traffic information data;

a mobile station modulator for digitally modulating the bit-energy/noise ratio of the traffic channel;

a mobile station transmitter for transmitting the modulated bit-energy/noise ratio signal to the base station;

a base station receiver for receiving the modulated bit-energy/noise ratio signal from the mobile station wherein a total power allocated in all forward channels managed by said base station is in a normal mode, at which the total power is lower than a predetermined threshold value, or in a threshold mode, at which the total power is at the predetermined power threshold value;

a base station digital demodulator for base band digitally demodulating the received modulated bit-energy/noise ratio signal;

a base station decoder for determining whether there is an error in the demodulated bit-energy/noise ratio signal;

means for determining and controlling a base station transmission power which receives the information after an error check, compares the bit-energy/noise ratio measured by the mobile station with a target value of the forward traffic channel power control, determines whether to increase or decrease a power of the forward traffic channel based on whether the base station is in the normal mode or threshold mode and controls a transmission power of the traffic channel;

a base station traffic channel modulator for modulating a traffic information signal with a traffic channel modulation gain corresponding to the base station transmission power determined at the means for determining and controlling the base station transmission power; and a base station transmitter for transmitting the modulated traffic information signal to the mobile station through the traffic channel.

* * * * *